Nov. 24, 1959 J. F. WEISHEW 2,914,626
ELECTRICAL CONTROL UNIT
Filed Sept. 6, 1957 3 Sheets-Sheet 1

INVENTOR.
JOSEPH F. WEISHEW
BY
ATTORNEY

Nov. 24, 1959 J. F. WEISHEW 2,914,626
ELECTRICAL CONTROL UNIT
Filed Sept. 6, 1957 3 Sheets-Sheet 2

INVENTOR.
JOSEPH F. WEISHEW
BY
[signature]
ATTORNEY

Nov. 24, 1959   J. F. WEISHEW   2,914,626
ELECTRICAL CONTROL UNIT
Filed Sept. 6, 1957   3 Sheets—Sheet 3

INVENTOR.
JOSEPH F. WEISHEW
BY
ATTORNEY

United States Patent Office 2,914,626
Patented Nov. 24, 1959

2,914,626

ELECTRICAL CONTROL UNIT

Joseph F. Weishew, Hatboro, Pa.

Application September 6, 1957, Serial No. 682,496

5 Claims. (Cl. 200—47)

This invention relates to electrical control apparatus and, more particularly, to a limit switch actuator for mechanically operating a plurality of electrical switches in response to the movement of an associated mechanism.

While various types of mechanical motion responsive electrical switches have been provided, such have usually been limited to specific applications, difficult to adjust, and inconvenient to mount upon and dismantle from the associated apparatus. It is therefore an object of the present invention to provide an electrical control unit which is responsive to mechanical movements of an associated apparatus for controlling predetermined electrical circuits that is simple in construction, efficient in operation, and which will overcome the aforementioned difficulties.

Another object of the present invention is to provide an electrical control unit in the form of a limit switch actuator having a stationary housing and a relatively movable plunger having means for connection to a moving machine part, which plunger is responsive to the movements of the part to open and close the various electrical switches within the housing for controlling electrical circuitry of associated apparatus.

Another object of the present invention is to provide an electrical control unit in the form of a limit switch actuator in which a plurality of mechanically operated electrical switches are arranged in longitudinally and laterally spaced relationship within the fixed housing, and a plunger is mounted for reciprocating longitudinal movement within said housing in response to movements of a machine part, whereby operating and actuating members associated with the plunger and switches are operative to open and close such switches in response to the movement of the machine part.

It is a further object of the present invention to provide a limit switch actuator of the above type in which a single plunger is operative to selectively actuate predetermined ones of the electrical switches within the housing during movement in either longitudinal direction thereof so that substantially any desired number of circuits may be controlled by the reciprocating longitudinal movement of the plunger during strokes thereof of any desired length as controlled by the movements of the associated machine part.

Other objects of the invention are to provide an electrical control unit bearing the above objects in mind which is of simple construction, has a minimum number of parts, is inexpensive to manufacture and efficient in operation.

All of the foregoing and still further objects and advantages of this invention will become apparent from a study of the following specification, taken in connection with the accompanying drawing, wherein.

Figures 1, 8, 9, 10, 11:
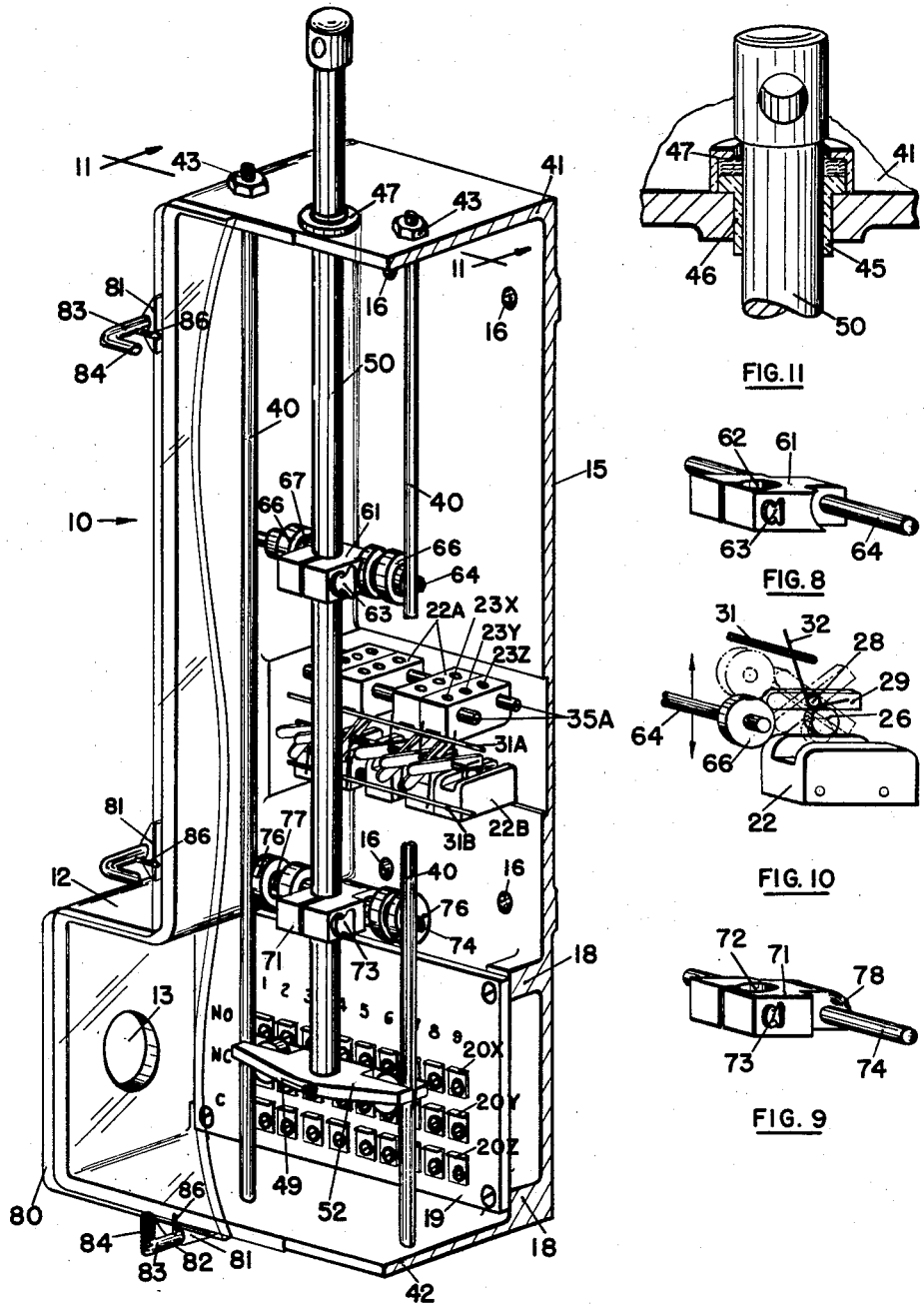
Figure 1 is a perspective view, with parts broken away, of a limit switch actuator made in accordance with the present invention.
Figure 8 is a perspective view of one of the dogs forming a part of the operating mechanism of the present invention.
Figure 9 is a view similar to Figure 8, showing a modified form of dog.
Figure 10 is a fragmentary perspective view showing the manner in which the actuating member acts between the operating member and electrical switch for controlling the switch in response to longitudinal movement of the operating member relative to the actuating member.
Figure 11 is an enlarged fragmentary cross sectional view taken along line 11—11 of Figure 1.

Referring now more in detail to the drawing, and more particularly to Figures 1 to 5 thereof, an electrical control unit made in accordance with the present invention is shown to include an L-shaped housing 10 having a longitudinal main body portion and a short side extension 12. This extension 12 is provided with an opening 13 in one wall for permitting the passage of an electrical cable therethrough. The base wall 15 is provided with a plurality of spaced openings 16 through which fastening elements may be extended for securing the housing 10 to any stationary object. The base wall 15 is also provided with a plurality of bosses 18 adjacent to the side extension 12 for supporting a terminal board 19 thereon.

This terminal board 19 has spaced sets of terminal clips 20x, y, z on the face side and connected terminal posts 21x, y, z on the back side. A single set of terminal clips and terminal posts are provided for each one of a plurality of limit switches 22 that are supported adjacent the mid portion of the housing 10. These switches 22 are also provided with terminal posts 23x, y, z which correspond to the terminal posts 21x, y, z of the terminal board so that wires may be connected thereto in order that the cable extending into the housing 10 through the opening 13 may be connected to selected ones of the switches 22.

The switches 22 may be either normally-open, normally-closed, all of one kind, or mixed, as may be desired in setting up the equipment. Of course, the manner in which the terminal posts are connected to the terminal board may also be used to arrange each of the switches in a normally-open or normally-closed relationship. However, the switches are also arranged within the closing in oppositely facing directions so that they will move between the open and closed positions in response to the movement of a control member in one of two longitudinal directions, as will hereinafter be described.

Figures 2, 3:
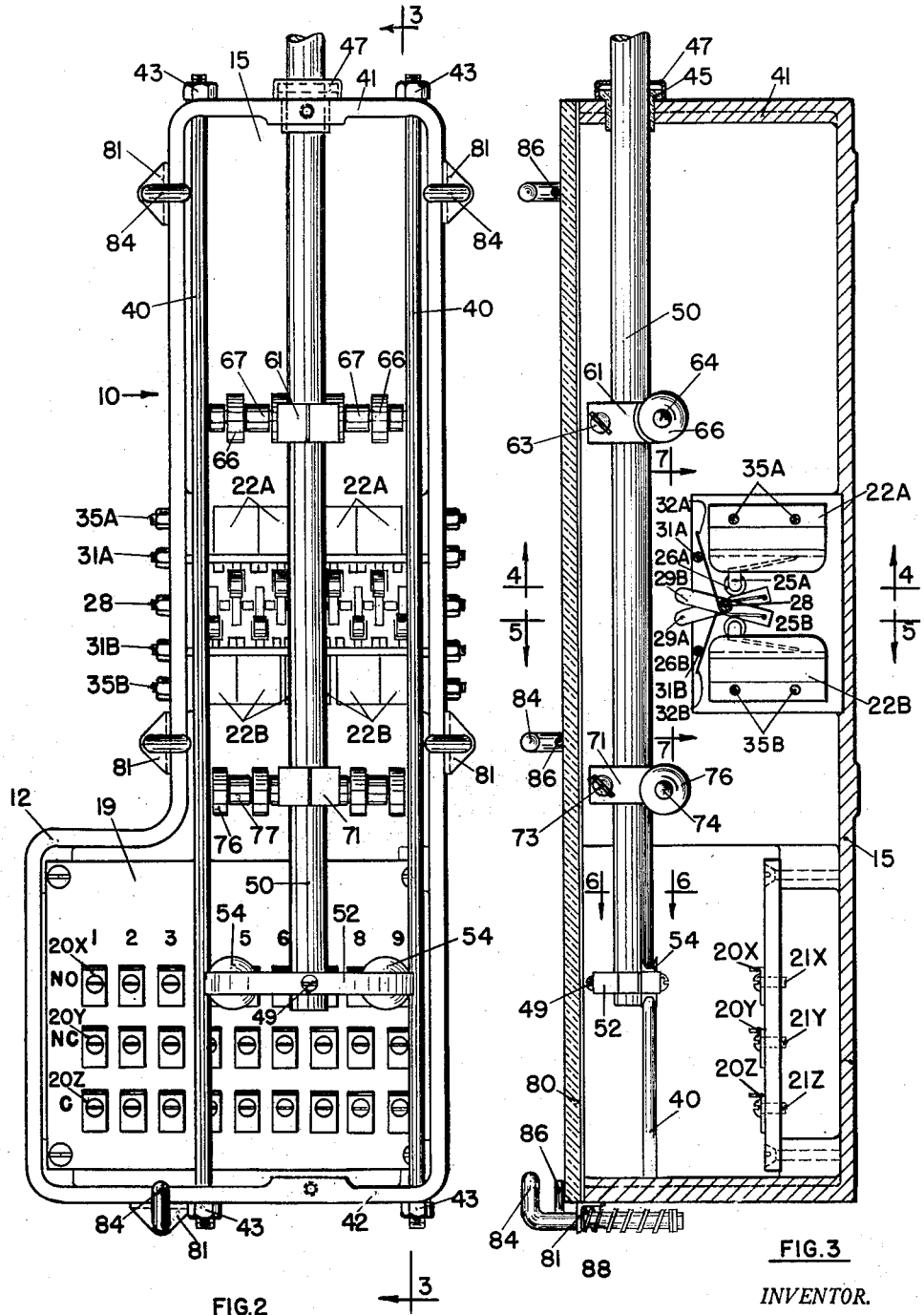
Figure 2 is a front plan view of the device shown in Figure 1, with the cover plate removed.
Figure 3 is a longitudinal cross sectional view taken along line 3—3 of Figure 2.
Figure 7:
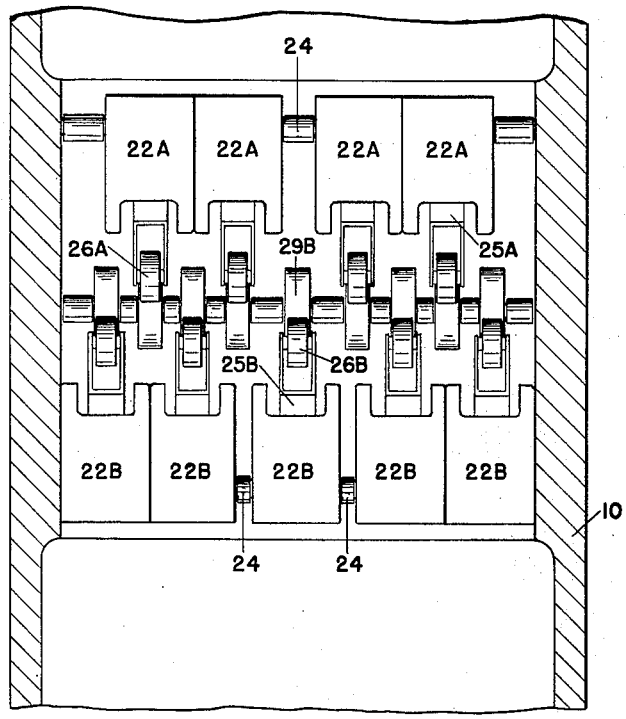
Figure 7 is an enlarged fragmentary top plan view, showing the arrangement of the electrical switches within the housing of the device.
Figure 6:
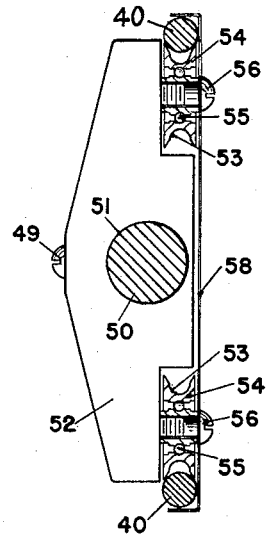
Figure 6 is an enlarged transverse cross sectional view taken along line 6—6 of Figure 3, showing one of the operating parts of the present device.
Figure 5:
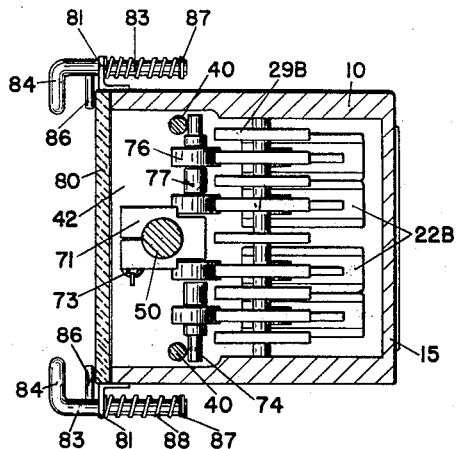
Figure 5 is a transverse cross sectional view taken along line 5—5 of Figure 3.
Figure 4:
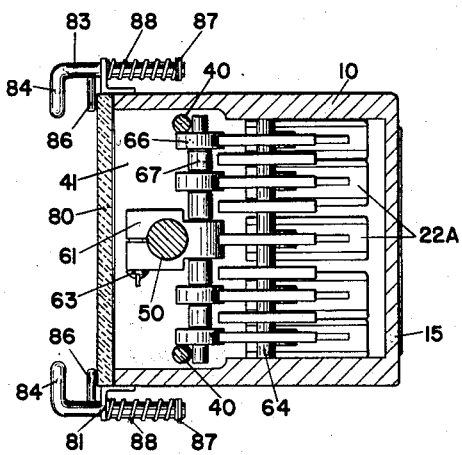
Figure 4 is a transverse cross sectional view taken along line 4—4 of Figure 3.

The switches are arranged in two groups 22a, b, both groups facing toward each other and each having a contact element 25a, b and frictionless roller 26a, b for opening and closing the switch in response to movement of a control member relative thereto. As is more clearly shown in Figures 3 and 10, a rod 28 extends transversely across the housing 10 intermediate the contact elements 25a, b of the respective switches. A plurality of switch actuating members or control levers 29a, b are rotatably supported upon the rod 28. A torsion spring 32a, b associated with each of the control levers 29a, b has one end in abutment with a transversely extending rod 31a, b, and the opposite end in engagement with a respective control lever, so as to bias one end of the lever into engagement with the roller of the associated switch. The opposite ends of the control levers 29a, b extend into a common plane as shown in Figure 3, the levers 29a associated with the one group of switches 22a being inclined toward one end of the housing, while the levers 29b associated with the other group of switches 22b are inclined toward the opposite end of the housing. A pair of transversely extending rods 35a, b associated with each group of switches 22a, b respectively, secure the switches in predetermined spaced lateral relationship relative to the switches in the same and opposite groups.

With reference now to Figures 1 to 3 and 11, a pair of laterally spaced parallel guide rods 40 extend longitudinally between the upper end wall 41 and lower end wall 42 and are secured in place thereto by associated nuts 43. A bushing 45 is secured within a centrally located opening 46 in the upper end wall 41 and is provided with a lubricant retainer cap 47. A plunger 50 is slidably received within the bushing 45 for reciprocating longitudinal movement relative thereto. A T-shaped head 52 is provided with a central bore 51 that slidably receives the inner end of the plunger 50 and is secured in an adjusted position relative thereto by a lock screw 49. A pair of guide rollers 54 are rotatably supported, one at each transverse extremity of the T-shaped head 52 upon roller bearing sets 55 carried by securement bolts 56. A keeper plate 58 extends beneath the T-shaped head 52 and is secured by the bolts 56 in encompassing relationship with the guide rollers 54. These rollers 54 are seated in substantially the same plane defined by the spaced rods 40 and have peripheral grooves 53 which rollably engage with the rods 40 so as to guide the head 52 and inner end of the plunger 50 for longitudinal movement within the housing 10 while the keeper plate 58 prevents the rods 40 from spreading apart during this longitudinal movement and during any rotational movement of the plunger 50 incidental thereto.

A plurality of longitudinally and laterally spaced operating members are secured to the plunger 50 for engagement with the actuating members or control levers 29 during the longitudinal movement of the plunger. These operating members include one or more longitudinally spaced dogs which support laterally spaced cam elements. One of the dogs 61 having a longitudinal bore 62 for slidably receiving the plunger 50, is provided with a wing nut 63 for fastening the dog at any desired position along the length of the plunger. As shown in Figure 8, a transversely extending support rod 64 extends through the dog 61 and rotatably supports a plurality of rollers 66 which act as cams during engagement with the control levers 29. The rollers 66 are maintained in proper lateral position by means of suitable spacer elements 67 that are secured to the rod 64. A somewhat modified form of dog 71 is shown to have a longitudinal bore 72 that similarly receives the plunger 50. A wing nut 73 provides clamping means for securing the dog 71 at any desired position along the length of the plunger 50. This dog is also provided with a transversely extending support rod 74 which rotatably supports laterally spaced rollers 76 that are maintained in proper lateral position by means of spacer elements 77 secured to the rod 74. This dog 71 is also provided with an arcuate surface 78 which is substantially concentric with the peripheral surface of the associated rollers 76 so that it functions in a similar manner and is operative to engage with one of the control levers 29 associated with one of the switches. Thus, a switch can be disposed immediately beneath the path of movement of the plunger 50 having a control lever for actuation by the arcuate surface 78, while the aforementioned dog 61 is devoid of such arcuate surface and is thus inoperative to engage any of the control levers that are engageable by the rollers or other dog 71.

A cover plate 80 is secured to the open top of the housing 10 by means of releasable locking members so that the cover may be removed at any time to gain access to the interior of the housing for resetting any of the switches, dogs, or rollers. These locking devices include brackets 81 that are integral with the sides of the housing 10 and which are provided with central holes 82 through which the legs 83 of L-shaped fasteners extend. Each of these fasteners is also provided with a base 84 which is adapted to be manually rotated. A finger 86 extends parallel to the base 84 and is integral with the mid portion of the leg 83 of each fastener. The free end of each leg 83 is provided with a substantially fixed washer 87 that forms a seat for one end of a compression spring 88. The opposite end of the spring 88 is seated against the lower surface of the bracket 81 so that the leg 83 is normally urged in a direction toward the base wall 15 of the housing. Thus, with the cover plate 80 in proper facing engagement with the open end of the housing 10, the L-shaped fasteners are pulled in a direction away from the base wall 15 so that the fingers 86 may be rotated to a position overlying the cover plate 80. If desired, the cover plate 80 may be of transparent material so that the operation of the control unit may be visible at all times so as to facilitate adjustment and repair thereof.

In use, the housing 10 is secured to a stationary support while the outer end of the plunger 50 is secured to a movable part of a machine. Thus, during movement of the machine part, the plunger 50 is reciprocated in a longitudinal direction relative to the switches 22. While a total of nine switches has been shown in the drawing for purposes of illustration, it will be recognized that any number of longitudinally spaced apart rows of such switches may be provided throughout the entire length of the housing, as well as placing any desired number of switches in laterally spaced apart relationship in each row. As hereinbefore described, the switches may be arranged in normally-open or normally-closed relationship, or mixed, as may be desired for the particular machine set up. Preferably, however, the switches in each row are staggered so that the control levers 29 of all of the switches are laterally spaced apart, whereby a single operating roller 66, 76 may be designated for engagement with a single one of the levers 29. On the other hand, any number of dogs may be secured to the plunger 50, each one of which may be provided with a roller for engaging a certain one of the switches so as to effect actuation of that switch any desired number of times during a single reciprocation of the plunger. The manner in which the rollers operate in connection with the actuating control levers 29 is clearly shown in Figure 10. It will be noted that movement of the roller 66 in an upward direction, as viewed in Figure 10, is operative to rotate the lever 29 to actuate the switch 22, whereas movement of the roller 66 in a downward direction is operative to rotate the lever 29 in an opposite direction which does not effect actuation of the contract element 25 of the switch. Thus, the switches 22a are arranged in the housing 10, as shown in Figure 1, so that they are actuated only during the downward movement of the plunger 50, whereas the other group of switches 22b are arranged for actuation during movement of the plunger 50 in an upward direction. The torsion springs 32 act upon the levers 29 to return them to their normally inclined positions at all times. The arcuate surface 78 of the modified form of dog 71 is operative to engage the center one of the lower group of switches 22b, as viewed in Figure 1. It will also be recognized that the rollers can be so arranged on each of any number of the support rods 64, 74 so that certain rollers on a single support rod may be used to actuate certain switches in one group, while other of the other rollers on the same support rod may be used to actuate certain switches in the other group. Furthermore, by providing a plurality of rollers in alignment with the perspective operating lever 29 of a particular switch, that switch can be actuated any desired number of times during a single cycle or reciprocation of the plunger. It will also be apparent that by controlling the length of the plunger stroke for any single cycle, certain ones of the dogs can be drawn over the actuating levers 29 while the others are not brought into association therewith during that cycle, but which may be relied upon for use during subsequent cycles.

Thus, it will be recognized that an electrical control unit has been provided in which a single housing and a single plunger can serve any desired number of circuit controlling functions in that virtually any desired number of switches can be supported within the housing for individual and selective actuation by selectively positioned operating members carried by the plunger during the movements of a machine part associated with the outer end of the plunger.

While this invention has been described with particular reference to the construction shown in the drawing, it is to be understood that such is not to be construed as imparting limitations upon the invention, which is best defined by the claims appended hereto.

Having thus described the invention, I claim as new and desire to secure by Letters Patent:

1. An electrical control unit comprising, in combination, a housing, a plurality of electrical switches supported in predetermined longitudinally and laterally spaced relationship within said housing, each one of said switches having actuating members projecting into a substantially common plane, a plunger slidably supported within said housing for reciprocating longitudinal movement spaced from and parallel to said plane, one end of said plunger extending outwardly of said housing and having means for connecting said plunger to an auxiliary device arranged for movement relative to said housing, a plurality of operating members carried by said plunger, said operating members extending into said plane for engagement with predetermined ones of said actuating members during longitudinal movement in both directions therebeyond, said switches being movable between circuit open and circuit closed positions, said switches being normally biased toward one of said circuit positions, said operating members upon engagement with said actuating members moving said switches toward the other of said positions, said actuating members comprising longitudinally and laterally spaced apart levers pivotally supported upon said housing one adjacent to each one of said switches, one end of each one of said levers extending into proximity with one of said switches and the other end thereof extending into said common plane, said operating members comprising cams for engaging said other end of said levers during movement in both longitudinal directions, and movement of each of said cams in one direction only being operative to effect pivotal movement of each of said respective levers in a direction to actuate said respective switches.

2. An electrical control unit as set forth in claim 1, wherein said operating members include at least one dog carried upon said plunger, a transverse rod secured to each said dog, and said cams comprising a plurality of rollers carried by each said transverse rod in laterally spaced apart relationship, said rollers extending into said common plane and being in longitudinal alignment with predetermined ones of said levers for engagement therewith in response to longitudinal movement of said plunger.

3. An electrical control unit as set forth in claim 2, wherein at least one said dog is adjustable longitudinally of said plunger, said dog having a curved surface extending into said common plane for engagement with at least one of said longitudinally and laterally spaced levers.

4. An electrical control unit as set forth in claim 1, wherein certain ones of said levers are arranged for movement to one of said positions during movement of said plunger in one direction and to the other of said positions during movement of said plunger in the other direction.

5. An electrical control unit as set forth in claim 4, wherein certain other ones of said levers are arranged for movement to said other position during movement of said plunger in said one direction and to said one position during movement of said plunger in said other direction.

References Cited in the file of this patent
UNITED STATES PATENTS

| | | |
|---|---|---|
| 2,248,010 | Nelles | June 1, 1941 |
| 2,650,275 | Doutt | Aug. 25, 1953 |
| 2,793,272 | Mock | May 21, 1957 |